United States Patent
Crowther

(10) Patent No.: US 10,570,621 B2
(45) Date of Patent: Feb. 25, 2020

(54) MEMBRANE

(71) Applicant: Sensor (UK) Ltd., Lancashire (GB)

(72) Inventor: Jon Crowther, Lytham (GB)

(73) Assignee: Sensor (UK) Ltd., Lancashire (GB)

( * ) Notice: Subject to any disclaimer, the term of this patent is extended or adjusted under 35 U.S.C. 154(b) by 0 days.

(21) Appl. No.: 15/774,724

(22) PCT Filed: Nov. 8, 2016

(86) PCT No.: PCT/GB2016/053487
§ 371 (c)(1),
(2) Date: May 9, 2018

(87) PCT Pub. No.: WO2017/081451
PCT Pub. Date: May 18, 2017

(65) Prior Publication Data
US 2018/0320380 A1 Nov. 8, 2018

(30) Foreign Application Priority Data

Nov. 11, 2015 (GB) .................................. 1519889.8
Mar. 14, 2016 (GB) .................................. 1604323.4

(51) Int. Cl.
*E04D 13/00* (2006.01)
*G01M 3/16* (2006.01)
*G01M 3/40* (2006.01)
*E02D 31/00* (2006.01)

(52) U.S. Cl.
CPC ......... *E04D 13/006* (2013.01); *E02D 31/008* (2013.01); *G01M 3/16* (2013.01); *G01M 3/40* (2013.01)

(58) Field of Classification Search
CPC .... E02D 31/008; E04D 13/006; G01M 33/16; G01M 3/40
See application file for complete search history.

(56) References Cited

U.S. PATENT DOCUMENTS

| 4,771,246 A | * | 9/1988 | Boryta | G01M 3/40 324/512 |
| 4,876,140 A | * | 10/1989 | Quackenbush | B29C 47/065 428/216 |
| 5,288,168 A | * | 2/1994 | Spencer | E02D 31/00 324/559 |

(Continued)

FOREIGN PATENT DOCUMENTS

WO 9110889 A1 7/1991

OTHER PUBLICATIONS

Weremczuk et al.; Humidity sensor printed on textile with use of ink-jet technology; 2012; all (Year: 2012).*

(Continued)

*Primary Examiner* — Benjamin F Fiorello
(74) *Attorney, Agent, or Firm* — Grady L. White; Potomac Law Group, PLLC

(57) ABSTRACT

A membrane 10 is a geomembrane 10, which takes the form of a non-conductive sheet 11. A conductive layer 13 is printed on to the sheet 11, in this instance in a geometric pattern of a rectangular grid. The lines of the grid 13 are conductive and connected to each other, with non-conductive gaps 15 disposed between the grid lines. Accordingly, a conductive linear network is formed, which has the requisite conductivity for leak detection.

19 Claims, 6 Drawing Sheets

(56) References Cited

U.S. PATENT DOCUMENTS

| | | | | |
|---|---|---|---|---|
| 5,544,976 | A * | 8/1996 | Marchbanks | B32B 27/12 |
| | | | | 405/129.6 |
| 5,850,144 | A * | 12/1998 | Howells | E02D 31/004 |
| | | | | 324/559 |
| 5,980,155 | A * | 11/1999 | Jones | B32B 5/26 |
| | | | | 405/43 |
| 7,877,952 | B2 * | 2/2011 | Milani | E04H 4/00 |
| | | | | 405/302.4 |
| 8,361,261 | B2 * | 1/2013 | Van Fossen | B29C 65/5028 |
| | | | | 156/182 |
| 8,944,720 | B2 * | 2/2015 | Nolt | B65G 5/00 |
| | | | | 405/54 |
| 9,033,620 | B2 * | 5/2015 | Youngblood, Jr. | G01M 3/40 |
| | | | | 405/302.7 |
| 9,341,540 | B2 * | 5/2016 | Gunness | G01M 3/40 |
| 9,624,671 | B1 * | 4/2017 | Gunness | E04D 13/006 |
| 9,624,672 | B1 * | 4/2017 | Gunness | G01M 3/40 |
| 9,651,448 | B1 * | 5/2017 | Miller | E02D 31/00 |
| 9,771,703 | B1 * | 9/2017 | Golding, Jr. | B32B 5/022 |

OTHER PUBLICATIONS

Saleem, Anam; Electronic Textiles; 2013 All (Year: 2013).*
Mecnika et al.; Smart textiles for healthcare: applications and technologies; 2014; All (Year: 2014).*

* cited by examiner

MEMBRANE

This invention relates to a membrane.

Plastic membranes—typically highly resistive plastic sheets—are installed to act as a barrier or liner in various installations. For example, geomembranes are installed in installations such as landfill sites, waste water containment facilities, hazardous chemical ponds, heap leach pads and the like. Furthermore, membranes are also installed in roofs (including green roofs), in order to waterproof buildings or other such structures. Still further, gas membranes are employed in the foundations of dwellings and industrial units, preventing the ingress of gas to the building by virtue of their low permeability with respect to relevant gasses.

In such installations, there is a need to detect and locate leaks in the membrane. The detection is enabled by augmenting the membrane with one or two electrically conductive layers, disposed on one or both sides of the membrane. In order to detect a leak, DC electrical signals are delivered to the electrically conductive layer, and measured in order to find the positions through which electricity is flowing, and therefore where damage exists.

Various methods of detecting and locating the leaks have been proposed, broadly comprising methods that are carried out during installation of the membrane (i.e. when the membrane is exposed before it is covered with material, prior to the installation entering service) and methods that are carried out after installation of the membrane (i.e. after the membrane has been covered by material, during the service life of the installation).

When the membrane is exposed during installation of a water-based system, electrical measuring equipment may be used to determine that water has passed through a hole in the liner. If the membrane is instead dry, an electric wand can be passed over the liner to generate a visible or audible spark in the vicinity of a hole in the membrane. When the membrane is subsequently covered, a "walk over" or dipole survey may be carried out, wherein a DC circuit is created but uses the installed, undamaged membrane as a block to circuit completion. By measuring the electric field created by the artificial transmission of DC signal and recording the potential difference between pairs of zero potential reference electrodes, it is possible to zone in on the conductive areas which can be the position of a hole/gap/damage in the membrane. Alternatively, a detection system based on the same principle as the "walk over" survey may be permanently installed, where a plurality of sensors are positioned to monitor the integrity of the membrane over the long term. Current research has shown that, in order to achieve a zero-leakage membrane, testing must occur to both the exposed geomembrane and the covered membrane.

Various materials and methods have been previously employed to add conductivity to the membrane in order to facilitate the leak detection. In one group of methods, the conductivity is provided by a separate layer from the membrane, which accordingly requires separate installation. For example, a separate conductive geotextile may disposed at one or both sides of the membrane, for example a geotextile using carbon doped synthetic fibres deployed into non-woven textile, carbon doped latex sprayed on to synthetic non-woven textile or a stainless steel net supported by polypropylene grid needle punched between two non-conductive layers. Alternatively, a conductive grid or netting made of carbon doped resin polymer may be provided at one or both sides of the membrane. Difficulties arise in that these products are often added solely because they are conductive, and not necessarily because of any other benefits provided by the supporting geotextile and as such they become additional layers in the design. Furthermore, such products require separate installation, configuration and connection to ensure functionality, which is time consuming during installation. Still further, a lack of direct contact between the conductive layer and the membrane may occur due to the terrain and/or wrinkling of the membrane, which can both act in isolation or in combination to separate the conductor from the rear face of the membrane.

In another group of methods, the membrane is provided with bonded conductivity, for example by coextruding carbon-doped polymer into a single membrane sheet liner such that one side of the membrane is conductive and the other is not, or by bonding a geotextile to a single sheet membrane liner, to give conductivity to a single side of the liner. Whilst such methods overcome some of the installation difficulties associated with the provision of separate layers, further difficulties arise when installing adjacent sheets of membrane. Particularly, when two sheets are partially overlapped for welding, the conductive backing of the front sheet of the two sheets is introduced into the weld, leading to a conductive region that affects subsequent leak detection around this region. Whilst conductivity can be removed from the welded joint, this is time consuming for the installer.

It is an aim of the present invention to overcome the above-mentioned disadvantages, and any other disadvantages that would be apparent to the skilled reader from the description below. It is a further aim of the present invention to provide a membrane with a conductive element that is easy to install, which is suitable for covered and exposed leak detection, and which provides excellent sensitivity for leak detection.

According to the present invention there is provided an apparatus and method as set forth in the appended claims. Other features of the invention will be apparent from the dependent claims, and the description which follows.

According to a first aspect of the invention there is provided a membrane comprising a non-conductive layer, and a first printed conductive layer formed on a first surface of the non-conductive layer.

The first printed conductive layer may comprise metal. The first printed conductive layer may comprise carbon, preferably graphene.

The first printed conductive layer may comprise a network of conductive areas, preferably conductive lines. The network may comprise a repeated geometric pattern. The pattern may be continuous. The pattern may be a continuous block of printing. The pattern may be a solid pattern. The pattern may be a solid block of printing. The pattern may be a rectangular grid pattern. Alternatively, the pattern may be a hexagonal grid pattern. Each rectangle or hexagon may have dimensions of 30 mm×30 mm.

The first printed conductive layer may comprise one or more printed tiles, preferably wherein each tile is separated by a gap. The first printed conductive layer may comprise one or more printed strips, preferably wherein each strip is separated by a gap.

The geomembrane may comprise a plurality of networks of conductive areas. The plurality of networks may be isolated by a non-conductive region disposed between the networks. Preferably, the non-conductive region has a width of approximately 1 cm.

The membrane may comprise a non-conductive border region between the first printed conductive layer and at least one edge of the geomembrane. The border region may have a width of 30 to 80 mm depending on the configuration of the welding process.

The membrane may comprise a second printed conductive layer formed on a second surface of the non-conductive layer. The second surface may be disposed on the opposite side of the membrane to the first surface. The features defined above in respect of the first printed conductive layer may apply likewise to the second printed conductive layer. Advantageously, the provision of conductive layers on both sides of the membrane enables the creation of homogenous surface conductivity.

The first printed conductive layer may comprise a repeated, preferably continuous, pattern and the second printed conductive layer may comprise one or more printed tiles and/or printed strips. Advantageously, this arrangement is particularly suited for the containment of liquid, whereby the capacitance effect of the water is avoided by applying a current to the first printed conductive layer and using the printed tiles and/or printed strips as a sensing medium.

The non-conductive layer may comprise a plastic. The plastic may be one of: high-density polyethylene (HDPE); linear low-density polyethylene (LLDPE); flexible polypropylene (fPP); polyvinylchloride (PVC); ethylene interpolymer alloy (EIA); thermoplastic polyurethane (TPU); polyvinylidene fluoride (PVDF); chlorinated sulphonated polyethylene (CSPE); ethylene propylene diene monomer (EPDM) rubber; polychloroprene; butyl rubber, and nitrile rubber.

The membrane may be a geomembrane. The membrane may be a roofing membrane. The membrane may be a gas membrane.

According to a second aspect of the invention, there is provided a method of manufacturing a membrane comprising the steps of forming a non-conductive layer and printing a first conductive layer on a first surface of the non-conductive layer.

The step of printing the first conductive layer may comprise applying an ink to the first surface. The ink may comprise a metal. Alternatively, the ink may comprise carbon, which may be graphene.

The ink may be applied before the non-conductive layer has fully cooled after the forming thereof. Alternatively, the method may further comprise the step of treating the first surface so as to render it receptive to the ink. The treating of the first surface may comprise one or more of the application of a chemical, high temperature flame torch treatment and plasma surface activation.

The ink may be applied by flexography. Alternatively, the ink may be applied by lithography. Alternatively, the ink may be applied by the gravure method.

The printing may comprise printing a network of conductive lines. The printing may comprise printing a network of conductive areas, although a conductive area formed by a block of conductive ink would work very well it is unlikely to be economic due to the quantity of ink used. The network may comprise a repeated geometric pattern. The pattern may be continuous. The pattern may be a rectangular grid pattern. Alternatively, the pattern may be a hexagonal grid pattern. Each rectangle or hexagon may have dimensions of 30 mm×30 mm. The printing may comprising printing one or more tiles, preferably wherein each tile is separated by a gap. The printing may comprise printing one or more strips, preferably wherein each strip is separated by a gap.

The printing may comprise printing a plurality of networks of conductive areas, preferably isolated by a non-conductive region disposed between the networks. Preferably, the non-conductive region has a width of approximately 1 cm.

The printing may comprise printing the conductive layer such that a non-conductive border region is formed between the conductive layer and at least one edge of the membrane.

The method may further comprise printing a second conductive layer on a second surface of the non-conductive layer. The second surface may be disposed on the opposite side of the membrane to the first surface. The method may comprising printing a repeated, preferably continuous, pattern on the first surface and one or more printed tiles and/or printed strips on the second surface.

The non-conductive layer may be formed from be one of: high-density polyethylene (HDPE); linear low-density polyethylene (LLDPE); flexible polypropylene (fPP); polyvinylchloride (PVC); ethylene interpolymer alloy (EIA); thermoplastic polyurethane (TPU); polyvinylidene fluoride (PVDF); chlorinated sulphonated polyethylene (CSPE); ethylene propylene diene monomer (EPDM) rubber; polychloroprene; butyl rubber, and nitrile rubber. The non-conductive layer may be formed by extrusion, preferably blown film extrusion or flat die extrusion. Alternatively, the non-conductive layer may be formed by calendaring, spread coating or extrusion coating.

The membrane may be a geomembrane. The membrane may be a roofing membrane. The membrane may be a gas membrane.

All of the features described herein can be combined with any of the above aspects in any combination.

For a better understanding of the invention, and to show how embodiments of the same may be carried into effect, reference will now be made, by way of example, to the accompanying diagrammatic drawings in which.

Like reference numerals are used to refer to like elements throughout the drawings.

Figure 1:
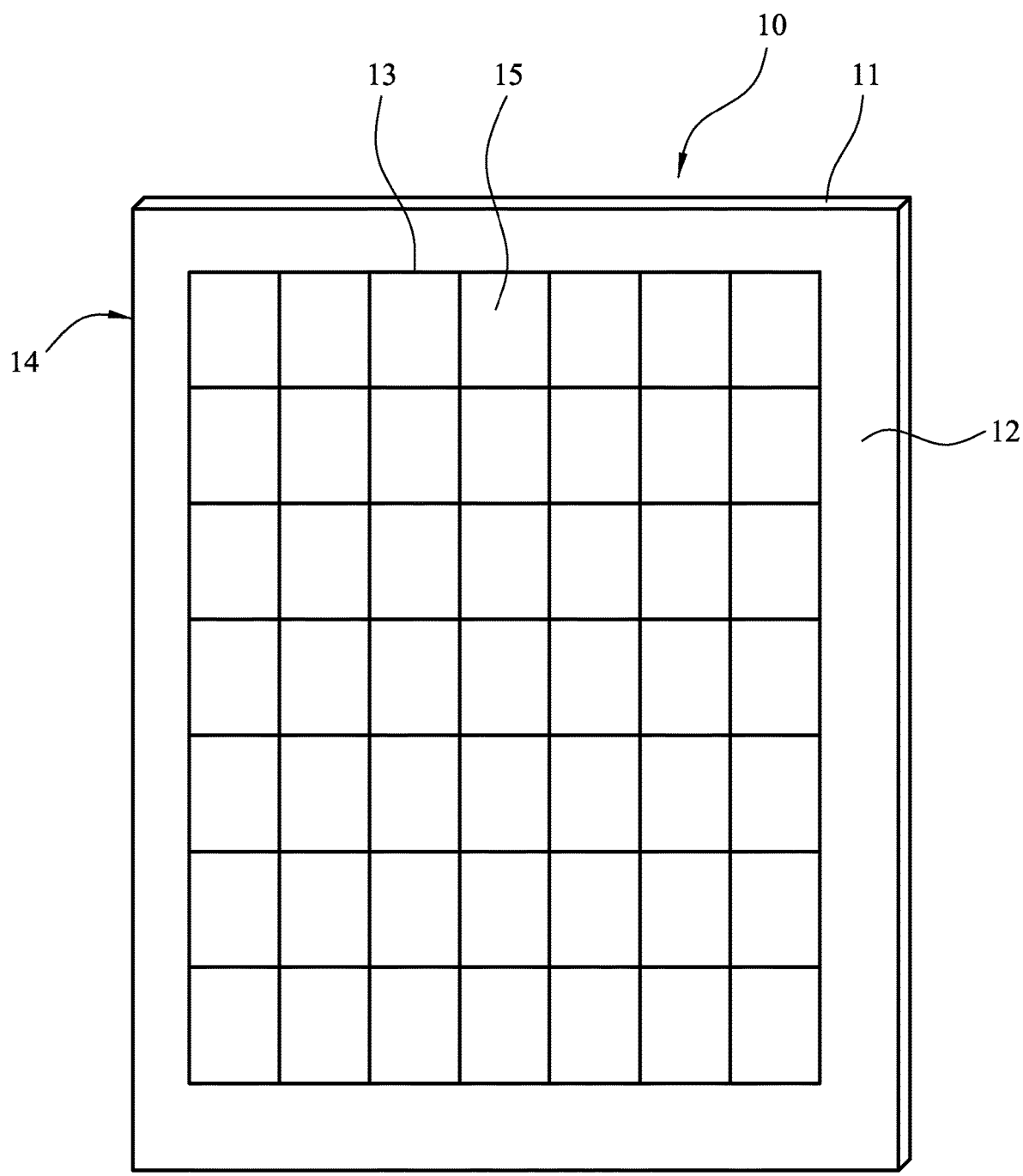
FIG. 1 is a schematic plan view of a membrane in accordance with an embodiment of the present invention.

FIG. 1 shows a membrane 10 in accordance with an embodiment of the invention. The membrane 10 is a geomembrane 10, which takes the form of a non-conductive sheet 11. A conductive layer 13 is printed on to the sheet 11, in this instance in a geometric pattern of a rectangular grid.

The lines of the grid 13 are conductive and connected to each other, with non-conductive gaps 15 disposed between the grid lines. Accordingly, a conductive linear network is formed, which has the requisite conductivity for leak detection.

In one example, the gaps 15 each have dimensions of approximately 30 mm×30 mm, though it will be understood that the dimensions may be varied depending on the sensitivity required. Furthermore, the thickness of the grid lines may similarly be varied.

A border region 12 is provided between the conductive grid 13 and the edge of the membrane 10. In one example, the border region 12 has a width of approximately 30 to 80 mm. Accordingly, plural sheets of membrane 10 can be welded together, without interfering with the conductivity provided by the layer 13.

In one example, a further conductive layer 13 is also printed on the rear side 14 of the sheet 11, so as to provide conductivity on both sides of the sheet.

Figure 2:
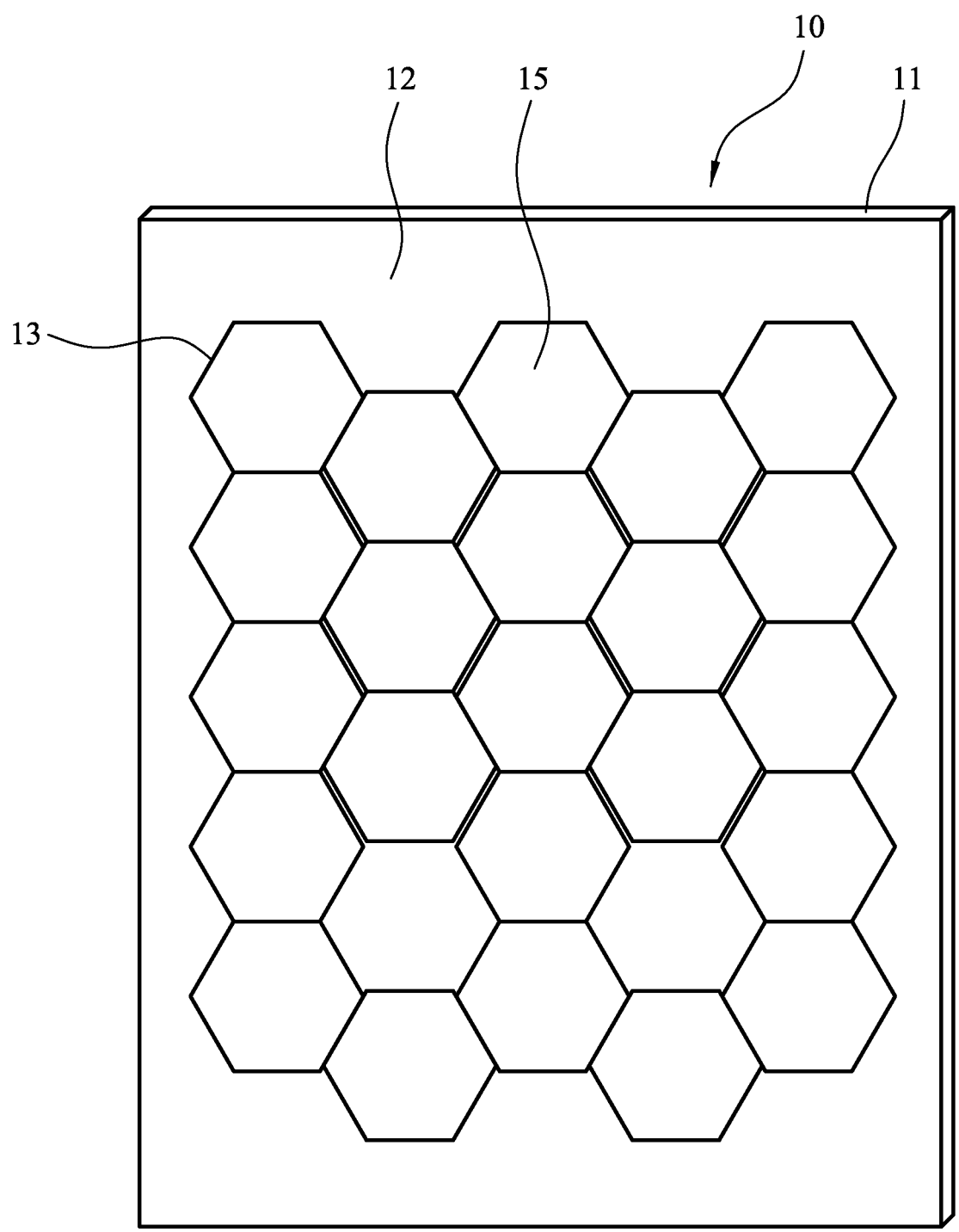
FIG. 2 is a schematic plan view of a membrane in accordance with an embodiment of the present invention.

FIG. 2 shows a further example membrane 10. The grid 13 is a repeating pattern of hexagonal shapes, but the membrane 10 is otherwise identical to the geomembrane shown in FIG. 1. The gaps 15 which form the interior of each hexagon also have dimensions of approximately 30 mm×30 mm.

Figure 4:
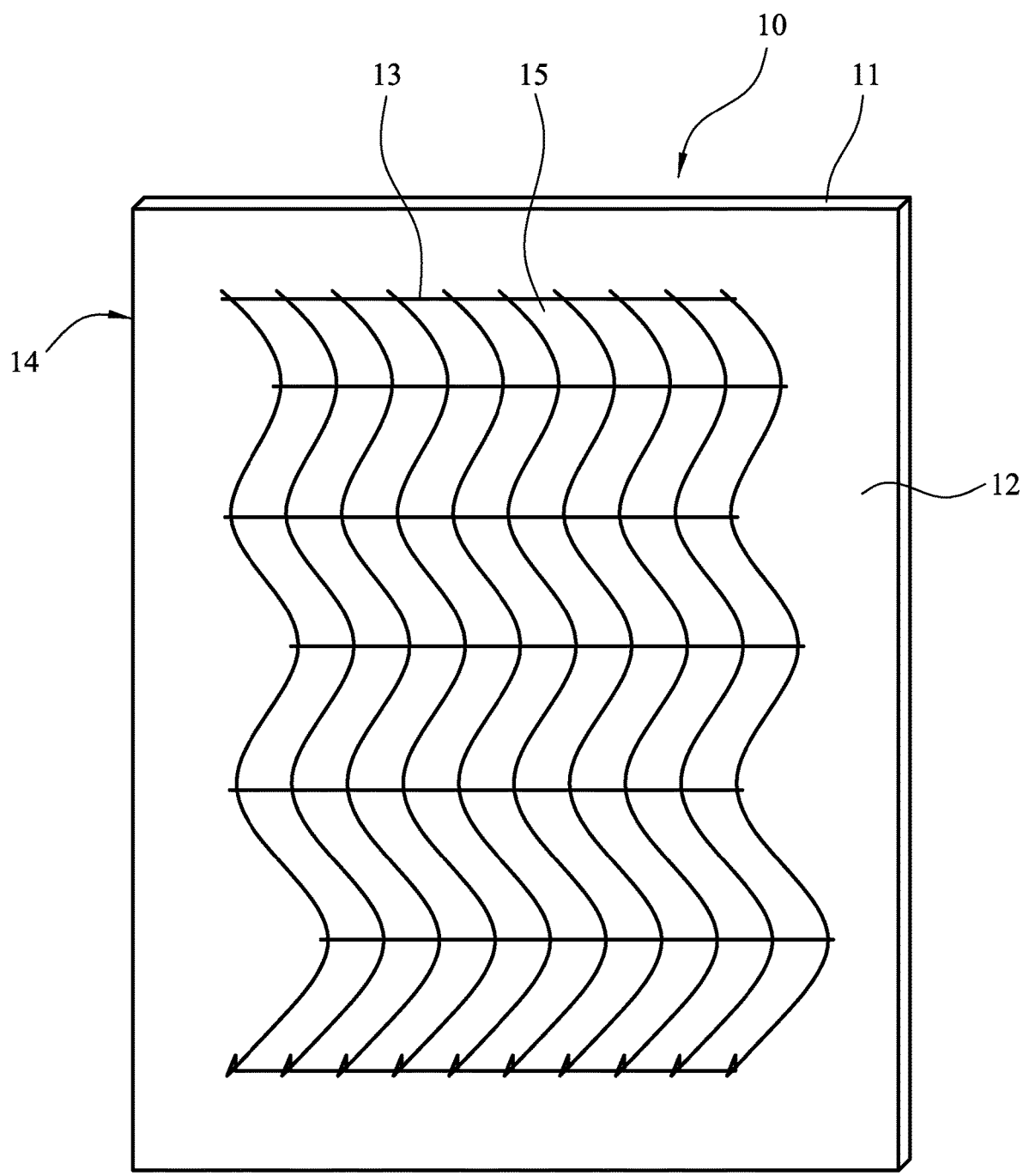
FIG. 4 is a schematic plan view of a membrane in accordance with an embodiment of the present invention.

It will be further understood that the conductive layer 13 could take the form of various other patterns, including other geometric shapes, non-geometric shapes, and continuous blocks of conductivity. For example, FIG. 4 shows a further example membrane 10, in which the conductive layer comprises a network of waved lines.

Figure 5:
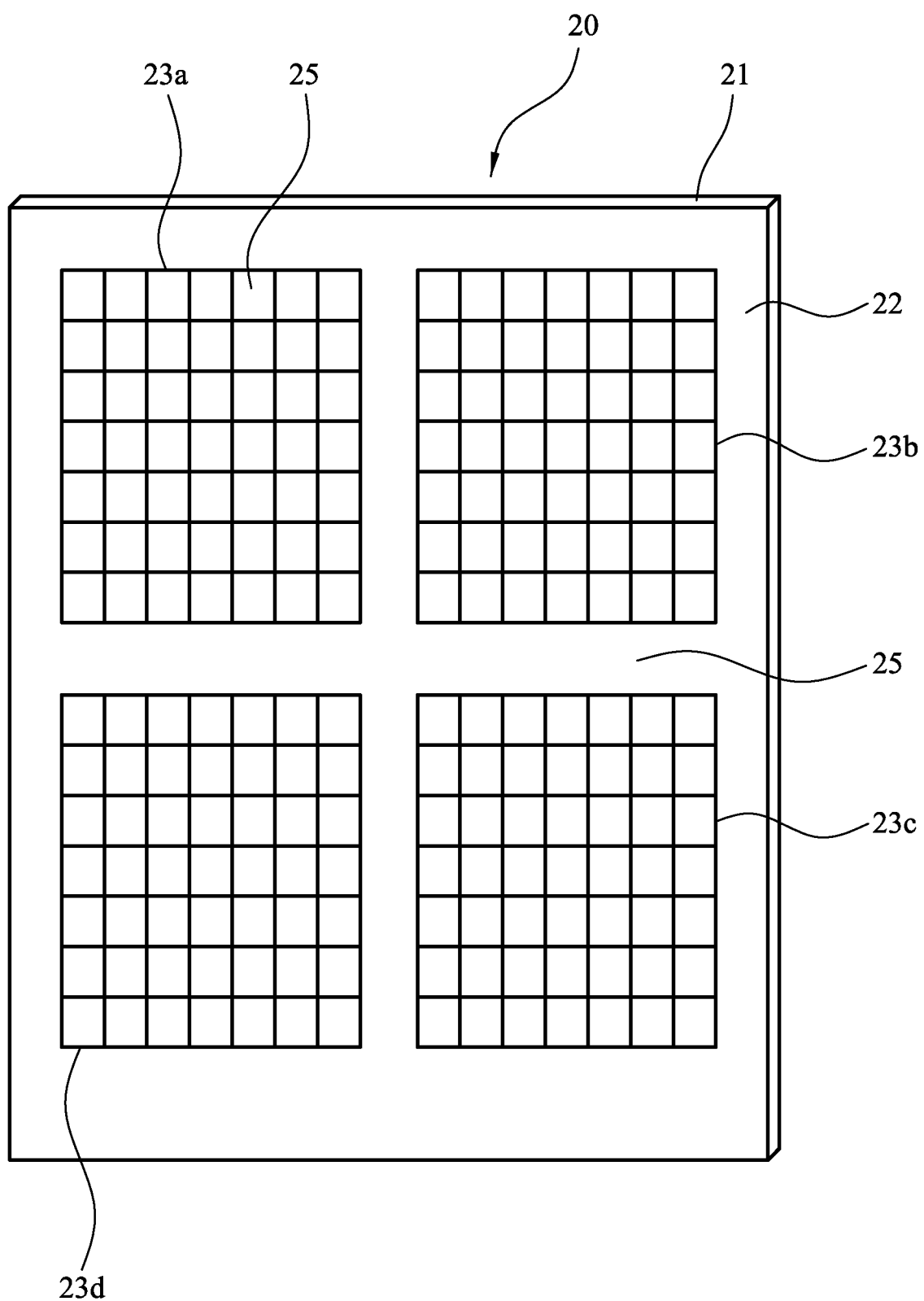
FIG. 5 is a schematic plan view of a membrane in accordance with an embodiment of the present invention.

FIG. 5 shows a further example membrane 20. This membrane 20 comprises a plurality of electrically isolated conductive regions 23 formed on the sheet 21, with a border 22 around the edge of the sheet 21.

In this case, the membrane 20 comprises four regions 23a-d, though it will be understood that the number of regions may be varied depending on the desired application. Each of the regions 23a-d forms an individual conductive region, not electrically connected to the other regions 23a-d. The regions are separated by non-conductive regions 25.

In the example shown in FIG. 5, each region 23 forms a rectangular grid similar to the grid 13 of FIG. 1. However, it will be understood that each region 23 may take the form of various other patterns, including other geometric shapes, non-geometric shapes, and continuous blocks of conductivity.

Figure 3:
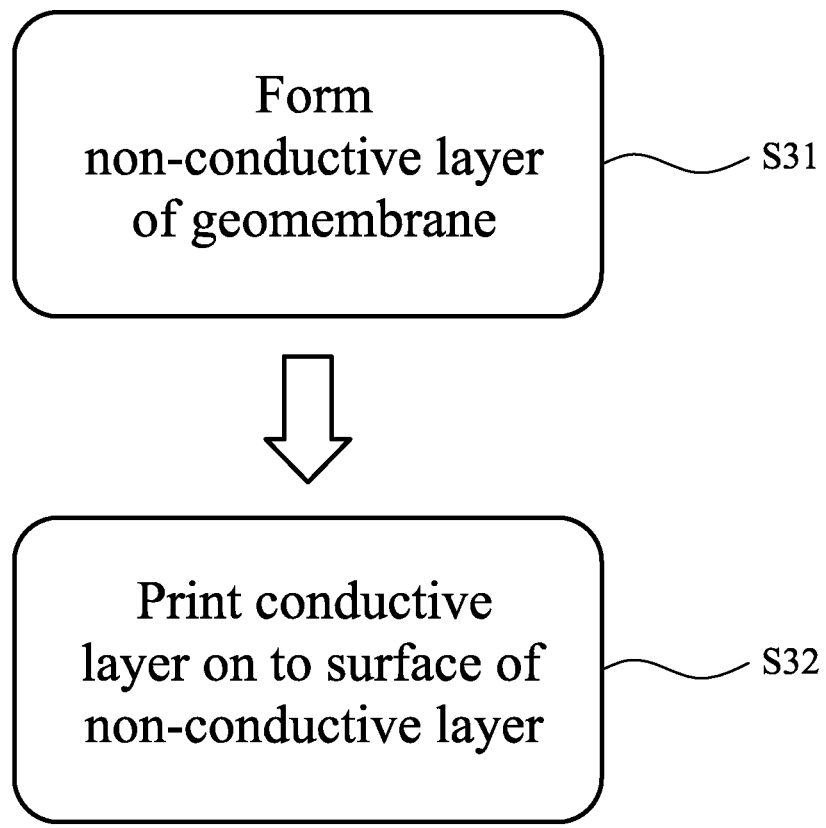
FIG. 3 is a flowchart illustrating a method of manufacturing a membrane in accordance with an embodiment of the present invention.

A method of manufacturing the membrane 10 will now be described, with reference to FIG. 3.

Firstly, in step S31, the non-conductive sheet 11 that forms the basis of the membrane is formed.

The non-conductive sheet 11 is formed from any suitable plastics material. For example, the sheet 11 may comprise one or more of the following materials: High-density polyethylene (HDPE); linear low-density polyethylene (LLDPE); flexible polypropylene (fPP); polyvinylchloride (PVC); ethylene interpolymer alloy (EIA); thermoplastic polyurethane (TPU); polyvinylidene fluoride (PVDF); chlorinated sulphonated polyethylene (CSPE); ethylene propylene diene monomer (EPDM) rubber; polychloroprene; butyl rubber, and nitrile rubber.

The sheet 11 is formed by any suitable method, including by extrusion (e.g. by blown film or flat die), calendaring, spread coating or extrusion coating.

Secondly, in step S32, the conductive pattern 13 is printed on to the sheet 11.

In particular, the conductive pattern 13 printed by applying an electrically conductive ink thereto. The ink comprises a conductive component, which renders the ink conductive. The ink then dries, forming the conductive pattern. In one example, the pattern 13 is printed on one side of the sheet 11. In a further example, the pattern 13 is printed on both sides of the sheet 11. In one example, the pattern comprises a plurality of electrically isolated conductive regions.

In one example, the ink comprises a metallic substance that renders the ink conductive. In a further example, the ink comprises carbon, which renders the ink conductive. In one example, the carbon is in the form of graphene.

In one example, the ink is applied during the process of cooling of the non-conductive sheet 11 after formation, but before the sheet 11 is fully cooled. Accordingly, the surface energy of the sheet 11 is higher, and the ink applied thereto more successfully adheres to the sheet 10.

In a further example, the ink is applied after the non-conductive sheet 11 has cooled. In one example, the cooled surface of the sheet 11 is energised so as to successfully receive the ink, for example by chemical treatment, high temperature flame torch treatment or plasma surface activation.

In one example, the ink is applied to the sheet using one of flexography, lithography or gravure printing processes. It will be understood that the particular printing technique may be varied, and that any suitable method of printing the conductive pattern 13 could be employed.

In use, the formed membrane 10 is installed in a location where leak detection is required. Plural sheets of the membrane 10 are arranged adjacent to one another, with a portion of their respective border regions 12 overlapping. The sheets 10 are then welded together in the border regions 12. Subsequently, the sheets 10 are connected to a suitable testing apparatus, allowing for the detection of leaks in the membranes 10.

Figure 6:
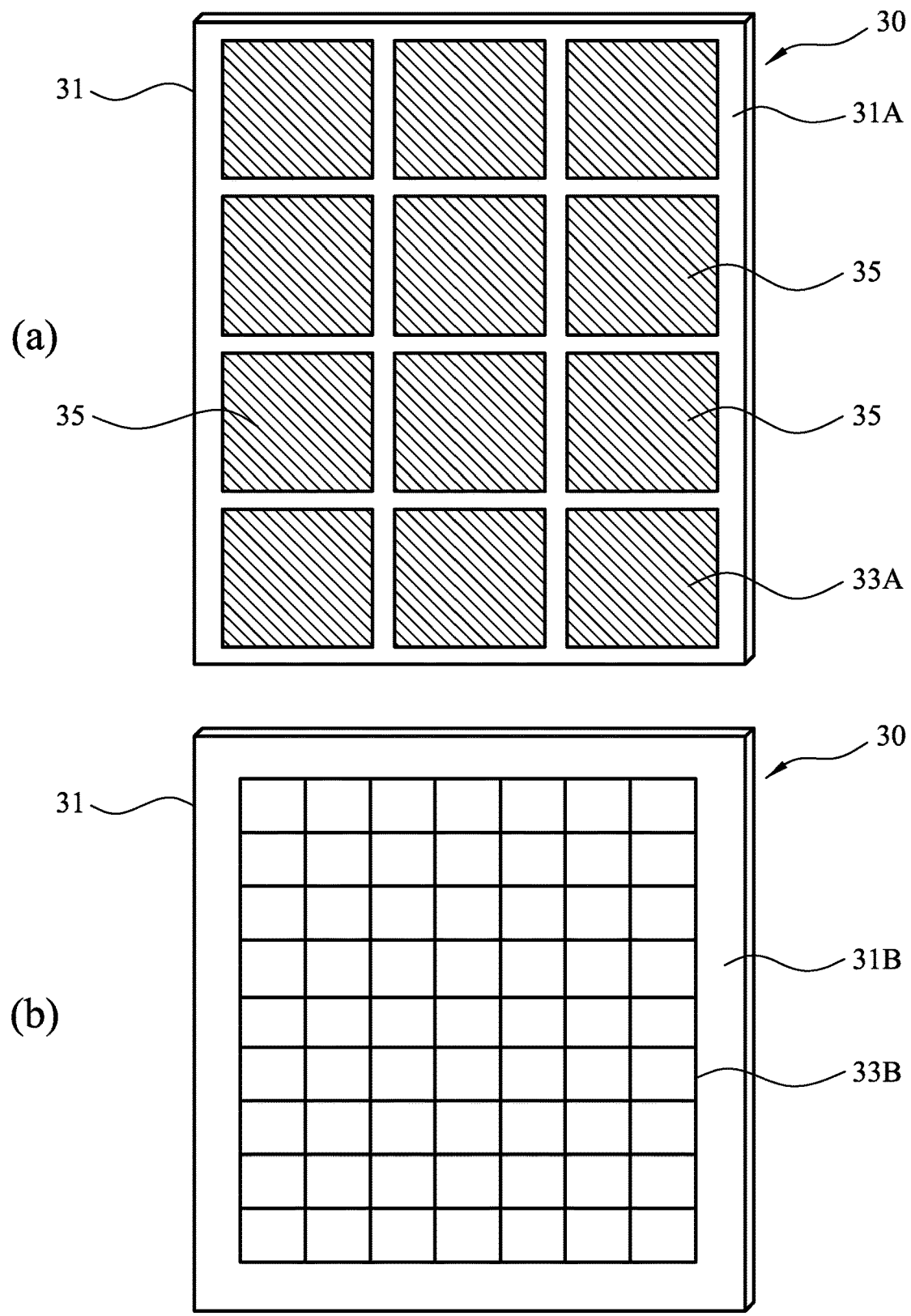
FIGS. 6A and 6B are schematic plan views of a front and rear of a membrane in accordance with an embodiment of the present invention.

FIG. 6 shows a further example membrane 30 in accordance with an embodiment of the invention. The membrane 30 is similar to the membranes 10, 20 described above, and comprises a non-conductive sheet 31, with a first conductive layer 33A formed on a first surface 31A of the sheet 31 and a second conductive layer 33B formed on a second surface 31B of the sheet 31. The first and second surfaces 31A and 31B are opposing surfaces of the sheet 31, with one forming the front surface and the other forming the rear surface.

In one example, the first conductive layer 33A comprises a plurality of conductive tiles 35. In further examples, the first conductive layer 33A comprises a plurality of conductive strips (not shown). The tiles and/or stripes may be continuous regions of conductivity.

In one example, the second conductive layer 33B comprises a continuous printed pattern. Whilst a printed grid pattern similar to that of membrane 10 of FIG. 1 is shown, it will be understood that the second conductive layer 33B may comprise any of the patterns outlined above.

The membrane 30 finds particular utility in the containment of liquid (e.g. water), where the capacitance effect of the water make cause difficulties in leak detection. In use, current is applied to the second conductive layer 33B. When a leak (e.g. a hole) occurs in the geomembrane 30, the liquid creates an electrical connection between the second conductive layer 33B and the first conductive layer 33A. The provision of the tiles 35 (or alternatively stripes) on the first conductive layer 33A allows more precise identification of the leak, because the leak can be isolated to a particular tile thereby indicated a particular position or sector of the membrane 30 that has been damaged.

Furthermore, the membrane 30 can also be electrically connected to provide homogenous surface conductivity. Accordingly, if both surfaces are connected and any conductive edges are clear of the ground so as to be isolated, an alert can be generated by a suitable detection system in the instance that there is a hole.

It will be appreciated that the membrane describe herein is advantageously easy to install, because the installation of a separate conductive layer is not required. Furthermore, the border region provided allows welding between adjacent membrane sheets without introducing regions of conductivity thereto.

It will be further appreciated that the use of graphene ink provides a flexible, optically transparent and electrically conductive pattern on the sheet, whilst providing benefits in terms of cost, environmentally stable, and reduced processing after printing.

It will be still further appreciated that the method of manufacturing the membrane 10 described herein advantageously provides a flexible method of forming a conductive portion of a membrane, wherein the particular size, shape and pattern of the conductive portion can be easily adjusted depending on the particular operational requirements of the membrane.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A membrane comprising a non-conductive layer comprising a plastic material, and a first printed conductive layer formed on a first surface of the non-conductive layer, the non-conductive layer and the first printed conductive layer forming a sheet of the membrane,
    wherein the first printed conductive layer comprises a plurality of electrically isolated conductive regions isolated from each other by a non-conductive region of the first printed conductive layer disposed between each of the electrically isolated conductive regions, and
    wherein the non-conductive layer comprises a non-conductive border region between the first printed conductive layer and at least one edge of the membrane, the non-conductive border region allowing the sheet of the membrane and another sheet of the membrane to be welded together without interfering with conductivity of the respective sheet of the membrane and the another sheet of the membrane.

2. A membrane according to claim 1, wherein the membrane is a geomembrane.

3. A membrane according to claim 1, wherein the first printed conductive layer comprises metal.

4. A membrane according to claim 1, wherein the first printed conductive layer comprises carbon.

5. A membrane according to claim 1, wherein the plurality of electrically isolated conductive regions and the non-conductive region disposed between each of the plurality of electrically isolated conductive regions form a network of electrically isolated conductive regions, in which the network comprises a repeated geometric pattern.

6. A membrane according to claim 1, wherein the first printed conductive layer comprises one or more printed tiles and/or strips.

7. A membrane according to claim 6, wherein each tile or strip is separated by a gap.

8. A membrane according to claim 1, comprising a second printed conductive layer formed on a second surface of the non-conductive layer.

9. A membrane according to claim 8, wherein the first printed conductive layer comprises a repeated pattern and the second printed conductive layer comprises one or more printed tiles and/or strips.

10. A method of manufacturing a membrane comprising the steps of forming a non-conductive layer and printing a first conductive layer on a first surface of the non-conductive layer,
    wherein the first printed conductive layer comprises a plurality of electrically isolated conductive regions isolated from each other by a non-conductive region of the first printed conductive layer disposed between each of the electrically isolated conductive regions, and
    wherein the membrane comprises a non-conductive border region disposed between the first printed conductive layer and at least one edge of the membrane.

11. A method of manufacturing a membrane according to claim 10, wherein printing the first conductive layer comprises applying an ink to the first surface.

12. A method of manufacturing a membrane according to claim 11, wherein the ink comprises a metal.

13. A method of manufacturing a membrane according to claim 11, wherein the ink comprises carbon.

14. A method of manufacturing a membrane according to claim 11, wherein the ink is applied before the non-conductive layer has fully cooled after the forming thereof.

15. A method of manufacturing a membrane according to claim 11, further comprising treating the first surface so as to render it receptive to the ink.

16. A method of manufacturing a membrane according to claim 15, wherein the treating of the first surface comprises one or more of the application of a chemical, high temperature flame torch treatment and plasma surface activation.

17. A method of manufacturing a membrane according to claim 11, wherein the ink is applied by flexography or lithography or gravure printing processes.

18. A method of manufacturing a membrane according to claim 10, wherein the printing comprises printing a network of conductive lines.

19. A method of manufacturing a membrane according to claim 10, further comprising printing a second conductive layer on a second surface of the non-conductive layer.

* * * * *